US008413240B2

(12) United States Patent
Katsunuma et al.

(10) Patent No.: US 8,413,240 B2
(45) Date of Patent: Apr. 2, 2013

(54) INFORMATION PROCESSING DEVICE, INFORMATION PROCESSING METHOD, AND COMPUTER READABLE RECORDING MEDIUM

(75) Inventors: Satoshi Katsunuma, Nagareyama (JP); Masahiro Goshima, Tokyo (JP); Hidetsugu Irie, Tokyo (JP); Ryota Shioya, Tokyo (JP); Shuichi Sakai, Tsukubamirai (JP)

(73) Assignee: Semiconductor Technology Academic Research Center, Kanagawa (JP)

( * ) Notice: Subject to any disclaimer, the term of this patent is extended or adjusted under 35 U.S.C. 154(b) by 591 days.

(21) Appl. No.: 12/411,771

(22) Filed: Mar. 26, 2009

(65) Prior Publication Data

US 2010/0083379 A1    Apr. 1, 2010

(30) Foreign Application Priority Data

Sep. 29, 2008 (JP) ................................. 2008-251255
Mar. 19, 2009 (JP) ................................. 2009-067407

(51) Int. Cl.
*G06F 11/00* (2006.01)
*G06F 12/16* (2006.01)
*G06F 13/00* (2006.01)
*G06F 13/28* (2006.01)
*G06F 11/30* (2006.01)
*G06F 12/14* (2006.01)
*G08B 23/00* (2006.01)

(52) U.S. Cl. ............ 726/23; 726/25; 711/157; 713/187; 713/188; 713/193

(58) Field of Classification Search ..................... 726/23; 711/157
See application file for complete search history.

(56) References Cited

U.S. PATENT DOCUMENTS

| | | | | |
|---|---|---|---|---|
| 6,567,900 | B1 * | 5/2003 | Kessler | 711/157 |
| 7,207,065 | B2 * | 4/2007 | Chess et al. | 726/25 |
| 7,406,714 | B1 * | 7/2008 | Nachenberg | 726/23 |
| 7,702,642 | B1 * | 4/2010 | Wolfman et al. | 707/999.101 |
| 7,757,282 | B2 * | 7/2010 | Pandit et al. | 726/22 |
| 7,788,235 | B1 * | 8/2010 | Yeo | 707/687 |
| 7,831,995 | B2 * | 11/2010 | Futoransky et al. | 726/1 |

(Continued)

OTHER PUBLICATIONS

Suh, Edward G., Jaewook Lee, Srinivas Devadas, Computer Science and Artificial Intelligence Laboratory (CSAIL), MIT, "Secure Program Execution via Dynamic Information Flow Tracking," 14 pages, 2004.*

(Continued)

*Primary Examiner* — Carolyn B Kosowski
(74) *Attorney, Agent, or Firm* — Christensen O'Connor Johnson Kindness PLLC

(57) ABSTRACT

An example of a device comprises a storage which stores data which is input from outside and to which tracking information is added, a section which detects a first reading event of first data from the storage to which the tracking information is added, a section which detects, after the first reading event, a first writing event to part of character string data to the storage, a section which detects, after the first writing event, a second reading event of second data from the storage to which the tracking information is added, a section which detects, after the second reading event, a second writing event to part of the character string data to the storage, and a section which adds, when the first reading/writing event, second reading/writing event are detected, the tracking information to data to be written to the storage by the first and second writing event.

9 Claims, 13 Drawing Sheets

U.S. PATENT DOCUMENTS

| | | | | |
|---|---|---|---|---|
| 7,849,509 | B2* | 12/2010 | Venkatapathy et al. | 726/25 |
| 7,860,842 | B2* | 12/2010 | Bronnikov et al. | 707/690 |
| 7,870,610 | B1* | 1/2011 | Mitchell et al. | 726/23 |
| 7,882,508 | B1* | 2/2011 | Aguilera | 719/320 |
| 7,958,558 | B1* | 6/2011 | Leake et al. | 726/23 |
| 8,074,281 | B2* | 12/2011 | Peinado et al. | 726/24 |
| 8,135,657 | B2* | 3/2012 | Kapoor et al. | 706/45 |
| 2006/0212941 | A1* | 9/2006 | Bronnikov et al. | 726/24 |
| 2006/0277604 | A1* | 12/2006 | Pandit et al. | 726/22 |
| 2007/0156644 | A1* | 7/2007 | Johnson et al. | 707/2 |
| 2007/0240141 | A1* | 10/2007 | Qin et al. | 717/158 |
| 2008/0216175 | A1* | 9/2008 | Pike | 726/22 |
| 2009/0049547 | A1* | 2/2009 | Fan | 726/22 |
| 2009/0172644 | A1* | 7/2009 | Nagarajan et al. | 717/128 |
| 2009/0183261 | A1* | 7/2009 | Peinado et al. | 726/24 |
| 2009/0320129 | A1* | 12/2009 | Pan et al. | 726/22 |
| 2009/0328210 | A1* | 12/2009 | Khachaturov et al. | 726/22 |
| 2011/0145918 | A1* | 6/2011 | Jung et al. | 726/22 |
| 2011/0218920 | A1* | 9/2011 | Agrawal et al. | 705/50 |
| 2011/0252475 | A1* | 10/2011 | Mui et al. | 726/23 |
| 2011/0314337 | A1* | 12/2011 | Sinha et al. | 714/37 |

OTHER PUBLICATIONS

Li, Kumbo, Ryota Shioya, Masahiro Goshima, Shuichi Sakai, String-wise information flow tracking against script injection attacks, 2009 15$^{th}$ IEEE Pacific Rim International Symposium on Dependable Computing, pp. 169-176, 2009.*

Dalton, M., et al., "Raksha: A Flexible Information Flow Architecture for Software Security," Proceedings of the 34th Annual International Symposium on Computer Architecture (ISCA 2007), Jun. 9-13, 2007, San Diego, pp. 482-493.

Furushou, N., and K. Abe, "Information Flow Tracking Based on Numbers of Taken and Untaken Branches," IEICE (Institute of Electronics, Information and Communication Engineers) Technical Report 108(181):17-22, Aug. 2008.

Katsunuma, S., et al., "SWIFT: String-Wise Information Flow Tracking," Symposium on Advanced Computing Systems and Infrastructures [SACSIS 2008], Information Processing Society of Japan 2008(5):167-176, Jun. 2008.

Notice of Reasons for Rejection dated Sep. 14, 2010, issued in corresponding Japanese Application No. 2009-067407, filed Mar. 19, 2009, 7 pages.

* cited by examiner

Example in which propagation of taint information is performed
Example 1-a 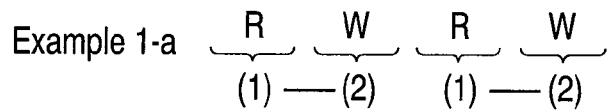
Example 1-b 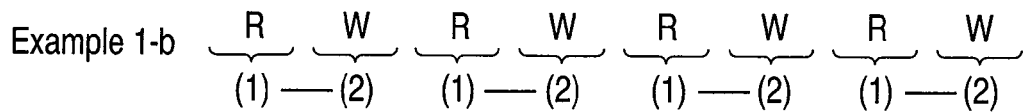
Example 1-c 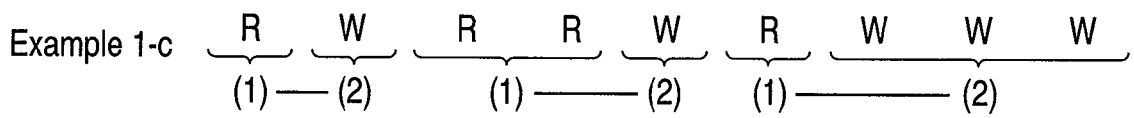
Example in which propagation of taint information is not performed
Example 2-a 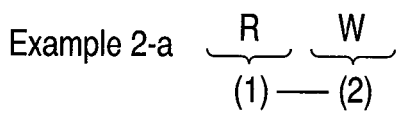
Example 2-b 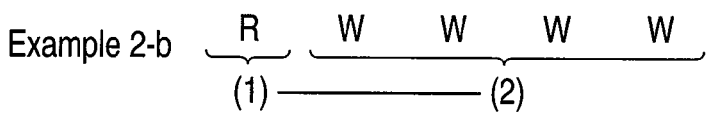
F I G. 2

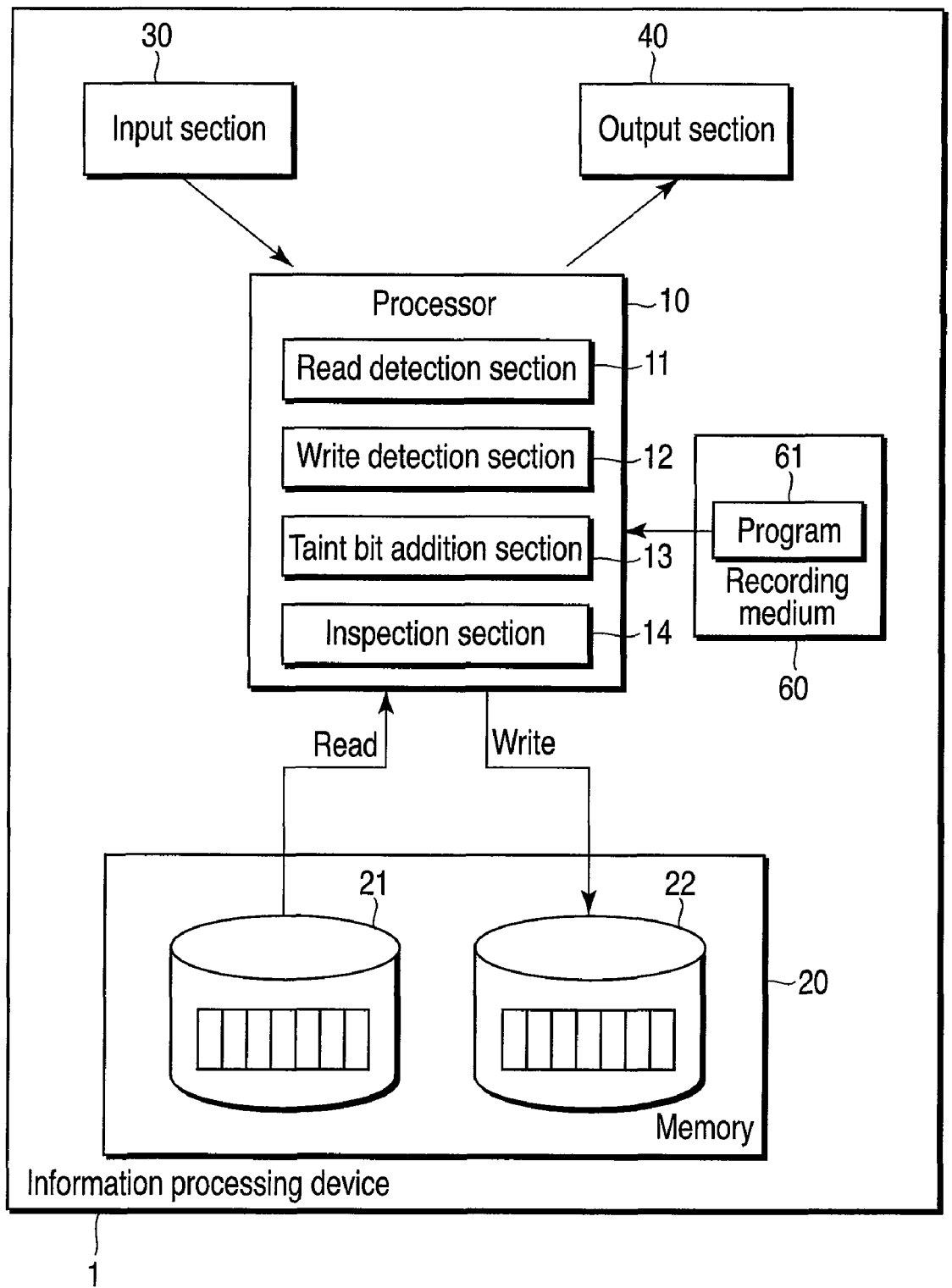
F I G. 3

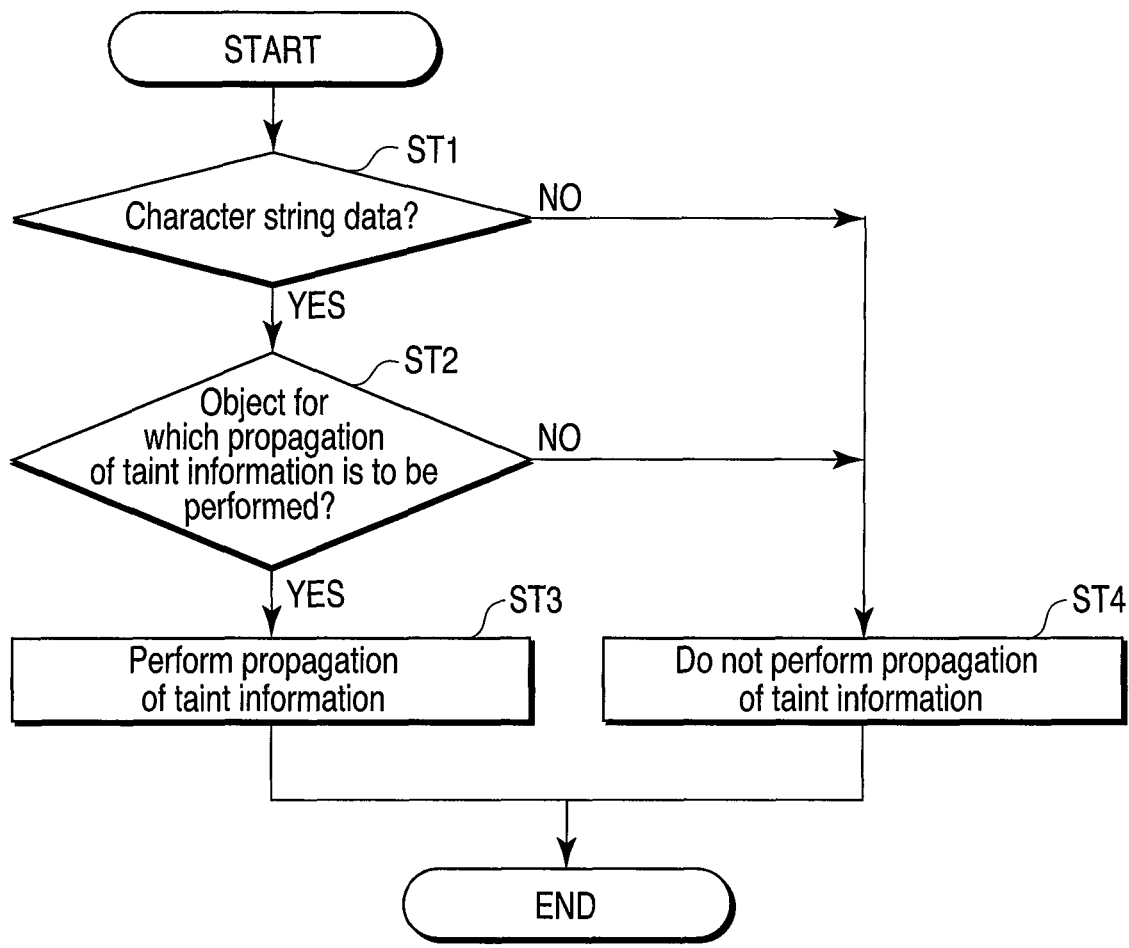
F I G. 6

| Name | Description |
| --- | --- |
| base_adr | Leading address of character string |
| next_adr | Predicted address for next address |
| cnt | Count of access to character string of interest |
| paired_cnt | Count of access to counterpart character string |
| paired_inc | Flag indicating whether paired_cnt is to be incremented |
| string | Flag indicative of character string or not |

FIG. 12

INFORMATION PROCESSING DEVICE, INFORMATION PROCESSING METHOD, AND COMPUTER READABLE RECORDING MEDIUM

CROSS-REFERENCE TO RELATED APPLICATIONS

This application is based upon and claims the benefit of priority from prior Japanese Patent Applications No. 2008-251255, filed Sep. 29, 2008; and No. 2009-067407, filed Mar. 19, 2009, the entire contents of both of which are incorporated herein by reference.

BACKGROUND OF THE INVENTION

1. Field of the Invention

The present invention relates to an information processing device, and information processing method intended for detection or the like of an injection attack against a computer system, and computer readable recording medium recording a program for realizing the information processing device and method.

2. Description of the Related Art

An injection attack against a computer system implies an attack to force the computer to execute an attack code or an attack command injected into the computer system from outside by utilizing vulnerabilities of the computer system.

At the beginning, the injection attacks were mainly ones against native code programs executed on clients, such as buffer overflow attacks. However, recently, attacks against server programs written in script languages, such as Perl, PHP, Java (registered trade name), have become more serious. It includes cross-site scripting (XSS), SQL injection, and the like. As in the former case, an attack dependent on the structure of the native code is called a low-level attack, and as in the latter case, an attack independent of the structure of the native code is called a high-level attack.

In order to detect such injection attacks, a group of techniques called Dynamic Taint Propagation (DTP) and Dynamic Information Flow Tracking (DIFT) have been proposed. DTP/DIFT adds tracking information to data handled by programs in order to indicate whether data is dependent on input. Utilizing this taint information, data dependent on input from outside is tracked dynamically, i.e., at the time of program execution, whereby injection attacks will be detected.

In the most basic method, the taint information of a data item is represented by one taint bit. Although description will be given on a taint bit used case, a substantially corresponding case will be included. And hereinafter data of which the taint bit is set is referred to as taint data.

More specifically, the following three processes (1-1) to (1-3) are performed.

(1-1) The taint bit of data is set when the data is given to a program from outside.

(1-2) The taint bits are propagated from sources to destinations according to dependence in the executed program.

(1-3) When the program produces output data, the taint bit of the data is inspected. If there is a taint bit set, it is determined that it is possibly an attack.

As will be described later, DTP/DIFT can be implemented in various ways with respect to the execution core of the processing.

Language-level DTPs, including the taint mode of Perl, define handling of the taint bits as part of the language specification. Accordingly, handling of the taints bit is defined with respect to the language structure of sentences or the like. In a typical case of an assignment statement, the taint bits of data items in the right-hand side are logically ORed and then propagated to the taint bit of the data item indicated by the left-hand side. This processing can be executed by an interpreter, by native code embedded by a compiler, by a processor or the like.

DIFT is a technique established by applying the taint mode of Perl to a processor in order to detect low-level injection attacks, and the execution core of the processing of above (1-2) is the processor. That is, handling of the taint bit is defined for an instruction executed by the processor. Typically, when the processor executes the instruction, the contents of the taint bits of the source operands are logically ORed and then propagated to the taint bit of the destination operand.

Although such DIFT is originally proposed to detect low-level injection attacks, DIFT can also detect high-level injection attacks. In DIFT, the processing of the above items (1-1) and (1-3) cannot be executed by the processor alone, and thus cooperation with components of the computer system other than the processor is made.

(2-1) The taint bit of data is set if the data is input from outside the computer system through a network or the like (not from outside the program).

(2-2) Taint information is propagated from the source to the destination in accordance with the dependence of the data.

(2-3) When data is output from the program, it is inspected not merely whether or not a taint bit of the data is set, but also of which part of the data taint bits are set. Some critical parts of the output should not be specified directly from outside of the computer system. If the output data is a character string for system call or a SQL command, for example, syntactic analysis of the output string is performed, and it is inspected whether a taint bit of critical parts, such as a command name or a file name, is not set.

As described before, DTP/DIFT can be implemented in various levels other than above, such as in the processor emulators, or in intermediate language interpreters such as Java (registered trade name) VM.

It should be noted that DTP/DIFT techniques independent on the specific language have the merit of being comprehensive. Language-level techniques can only be applied to programs described in the specific language as a matter of course. On the other hand, language-independent techniques can be applied to all the programs which are executed thereon.

In a program that provides meaningful service, the output thereof is dependent on the input. Otherwise the program always produces the same output. Such a program is actually useless. As a result, if completely strict DTP/DIFT is applied for a meaningful program, the taint bits of every output data items will be set because the output thereof is somehow dependent on the input, which is meaningless. Consequently, in order to make DTP/DIFT meaningful, a non-propagation rule of not performing propagation of taint bits when a certain condition is satisfied is important.

There is no room for contrivance for direct dependence caused by data dependence, while handling of indirect dependences caused by conditional branching or indirect reference are difficult. Conventional DTP/DIFT techniques define non-propagation rules for indirect dependences mechanically and thus suffer from tradeoff between false detections (false positive) and detection leakages (false negative).

In DIFT, in which the propagation is performed by the processor, it is particularly difficult. To begin with, it is difficult to specify the range of the dependence destination of the branch condition in a conditional branch.

Even in the language-level DTPs, the non-propagation rule is mechanically defined on the language grammar. Perl taint mode, for example, does not propagate taint information through regular expression matches. Even in a case of a match replacing a plus sign with a blank character, which has no effect on the injection attack, propagation is not performed.

As prior art technical document information, there is Document 1, (Michael Dalton, et al. "Raksha: A Flexible Information Flow Architecture for Software Security)", International Symposium on Computer Architecture, 2007, pp. 227-232).

BRIEF SUMMARY OF THE INVENTION

An information processing device according to the first example of the invention comprises: a storage section which stores therein data which is input from outside, and to which tracking information is added; a first reading detection section which detects a first reading event of first data from the storage section to which the tracking information is added; a first writing detection section which detects, after execution of the first reading event, a first writing event to part of character string data to the storage section; a second reading detection section which detects, after execution of the first writing event, a second reading event of second data from the storage section to which the tracking information is added; a second writing detection section which detects, after execution of the second reading event, a second writing event to part of the character string data to the storage section; and an addition section which adds, when the first reading event, first writing event, second reading event, and second writing event are detected by the first reading detection section, first writing detection section, second reading detection section, and second writing detection section, the tracking information to data to be written to the storage section by the first writing event and second writing event.

An information processing device for performing propagation of taint information for the purpose of detecting an injection attack according to the second example of the invention, comprises: a determination section for determining whether or not partial series of the time series consisted of a reading event and writing event in the execution of a program satisfy a first condition and second condition; and a propagation section, when it is determined by the determination section that the partial series satisfy the first condition and second condition, performs propagation of the taint information to write-object data satisfying the first condition. The first condition is that all events of writing to one character string should be included in the partial series. The second condition is that the time series should be consisted of a series of two or more partial series groups each of which is consisted of a first partial series and a second partial series subsequent to the first partial series. The first partial series includes one or more events of reading of tainted data, and does not include an event of writing of the first condition. The second partial series includes one or more events of writing of the first condition, and does not include an event of reading of tainted data.

An information processing device according to the third example of this invention comprises: a reading series detection section detecting a reading series which includes a plurality of reading events for reading out first character string data with tracking information added thereto from a memory section, and detecting occurrence timings of the reading events; a writing series detection section detecting a writing series which includes a plurality of writing events for storing second character string data into the memory section, and detecting occurrence timings of the writing events; an interleaving determination section determining whether an interleaving relationship is satisfied between "a plurality of reading event groups which are included in the reading series and include one or more sequential reading events" and "a plurality of writing event groups which are included in the writing series and include one or more sequential writing events" on the basis of the reading series and the occurrence timings of the reading events which are detected by the reading series detection section and the writing series and the occurrence timings of the writing events which are detected by the writing series detection section; and a tracking information addition section adding the tracking information to the character string data which is to be written by one or more of the writing events included in one or more of the writing event groups which are determined to have the interleaving relationship by the interleaving determination section.

An information processing method being executed by a computer according to the fourth example of this invention comprises: storing therein data which is input from outside, and to which tracking information is added with a storage section; detecting a first reading event of first data from the storage section to which the tracking information is added; detecting, after execution of the first reading event, a first writing event to part of character string data to the storage section; detecting, after execution of the first writing event, a second reading event of second data from the storage section to which the tracking information is added; detecting, after execution of the second reading event, a second writing event to part of the character string data to the storage section; and adding, when the first reading event, first writing event, second reading event, and second writing event are detected, the tracking information to data to be written to the storage section by the first writing event and second writing event.

An information processing method for performing propagation of taint information for the purpose of detecting an injection attack according to the fifth example of this invention, comprises: determining whether or not partial series of the time series consisted of a reading event and writing event in the execution of a program satisfies a first condition and second condition; and performing, when it is determined that the partial series satisfy the first condition and second condition, propagation of the taint information to write-object data satisfying the first condition. The first condition is that all events of writing to one character string should be included in the partial series. The second condition is that the time series should be consisted of a series of two or more partial series groups each of which is consisted of a first partial series and a second partial series subsequent to the first partial series. The first partial series includes one or more events of reading of tainted data, and does not include an event of writing of the first condition. The second partial series includes one or more events of writing of the first condition, and does not include an event of reading of tainted data.

An information processing method being executed by a computer according to the sixth example of this invention comprises: detecting a reading series which includes a plurality of reading events for reading out first character string data with tracking information added thereto from a memory section, and detecting occurrence timings of the reading events; detecting a writing series which includes a plurality of writing events for storing second character string data into the memory section, and detecting occurrence timings of the writing events; determining whether an interleaving relationship is satisfied between "a plurality of reading event groups which are included in the reading series and include one or more sequential reading events" and "a plurality of writing event groups which are included in the writing series and include one or more sequential writing events" on the basis of the reading series and the occurrence timings of the reading events which are detected and the writing series and the occurrence timings of the writing events which are detected; and adding the tracking information to character string data which is to be written by one or more of the writing events included in one or more of the writing event groups which are determined to have the interleaving relationship.

A computer readable recording medium according to the seventh example of this invention stores a program being executed a computer. The program comprises: a storage section which stores therein data which is input from outside, and to which tracking information is added; a first reading detection section which detects a first reading event of first data from the storage section to which the tracking information is added; a first writing detection section which detects, after execution of the first reading event, a first writing event to part of character string data to the storage section; a second reading detection section which detects, after execution of the first writing event, a second reading event of second data from the storage section to which the tracking information is added; a second writing detection section which detects, after execution of the second reading event, a second writing event to part of the character string data to the storage section; and an addition section which adds, when the first reading event, first writing event, second reading event, and second writing event are detected by the first reading detection section, first writing detection section, second reading detection section, and second writing detection section, the tracking information to data to be written to the storage section by the first writing event and second writing event.

A computer readable recording medium according to the eighth example of this invention stores a program being executed a computer. The program performs propagation of taint information for the purpose of detecting an injection attack. And the program comprises: a determination section for determining whether or not partial series of the time series consisted of a reading event and writing event in the execution of a program satisfy a first condition and second condition; and a propagation section, when it is determined by the determination section that the partial series satisfy the first condition and second condition, performs propagation of the taint information to write-object data satisfying the first condition. The first condition is that all events of writing to one character string should be included in the partial series. The second condition is that the time series should be consisted of a series of two or more partial series groups each of which is consisted of a first partial series and a second partial series subsequent to the first partial series. The first partial series includes one or more events of reading of tainted data, and does not include an event of writing of the first condition. The second partial series includes one or more events of writing of the first condition, and does not include an event of reading of tainted data.

A computer readable recording medium according to the ninth example of this invention stores a program being executed a computer. The program comprises: a reading series detection section detecting a reading series which includes a plurality of reading events for reading out first character string data with tracking information added thereto from a memory section, and detecting occurrence timings of the reading events; a writing series detection section detecting a writing series which includes a plurality of writing events for writing second character string data into the memory section, and detecting occurrence timings of the writing events; an interleaving determination section determining whether an interleaving relationship is satisfied between "a plurality of reading event groups which are included in the reading series and include one or more sequential reading events" and "a plurality of writing event groups which are included in the writing series and include one or more sequential writing events" on the basis of the reading series and the occurrence timings of the reading events which are detected by the reading series detection section and the writing series and the occurrence timings of the writing events which are detected by the writing series detection section; and a tracking information addition section adding the tracking information to the character string data which is to be written by one or more of the writing events included in one or more of the writing event groups which are determined to have the interleaving relationship by the interleaving determination section.

BRIEF DESCRIPTION OF THE SEVERAL VIEWS OF THE DRAWING

FIG. 2 is specific examples showing the propagation method of the taint bit according to the first embodiment;

FIG. 3 is a block diagram showing the first example of an information processing device according to the first embodiment;

FIG. 6 is a flowchart of information processing which is executed by the information processing device of the FIG. 5;

FIG. 12 is a table showing an example of a character string detection table according to the third embodiment of the present invention;

DETAILED DESCRIPTION OF THE INVENTION

Figure 1:
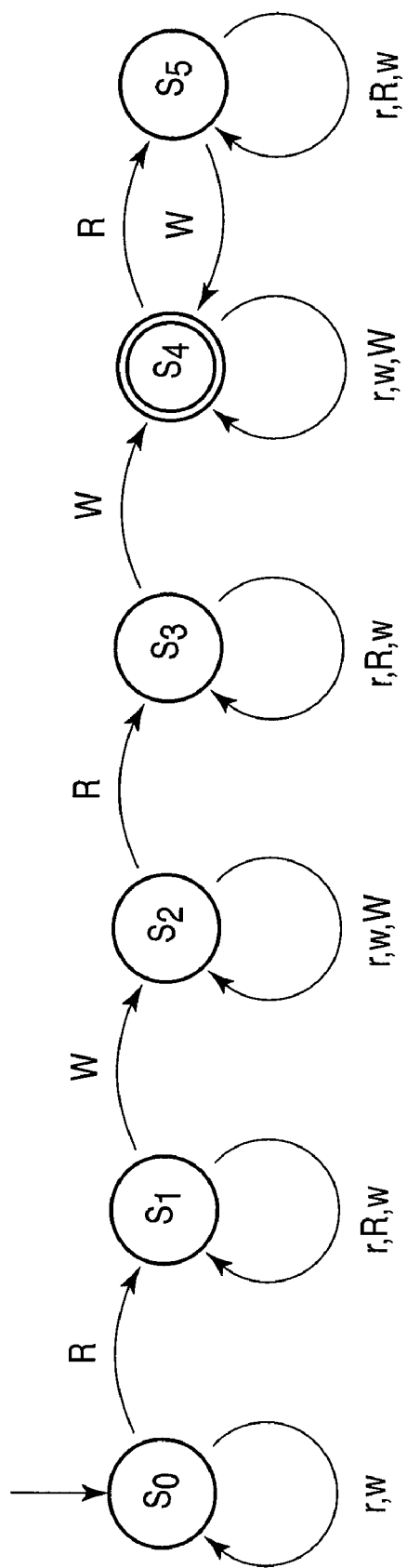
FIG. 1 is a state transition diagram showing an example of a propagation method of a taint bit according to the first embodiment of the present invention.

Embodiments of the present invention will be described below with reference to the accompanying drawings. In the embodiments of the present invention, although a description will be given by taking a case where a taint bit is used as an example of tracking information indicative of input data or data dependent on the input data, other information may also be used. Same components will be denoted by the same reference numeral in each drawing below.

The First Embodiment

[1] Rule of Propagation of Taint Information

The present inventor has made the following consideration of a rule of a case where propagation of a taint bit is performed.

In a program, there are one or more paths of dependence from the input to the output. Regarding the injection attack against a computer system, it is sufficient if only paths in which both the input and output are character strings among these paths are taken into consideration. Such a path is consisted of one or more partial processing items. Each partial processing is divided into the following two types according to whether or not the main body that prepares a character string to be output is the program.

The first type is the n-fold choice processing. In this processing, one of n character strings prepared by the program is selected by the input, and the selected character string is output.

The second type is the free-form processing. In this processing, an input character string is output as it is or is output after being subjected to character string conversion. The character string conversion mentioned herein implies conversion in which only the character expression method is converted and the expressed contents are not substantially changed, such as conversion from/into an upper case character into/from a lower case character, and from/into a single-byte character into/from a double-byte character, conversion associated with different character codes, URL encode/URL decode, and the like.

In these two types of processing, the n-fold choice processing is safe from the injection attack, and the free-form processing is dangerous from the injection attack. Accordingly, it is sufficient if propagation of taint bit information from the input character string to the output character string is performed with respect to the free-form processing, and is not performed with respect to the n-fold choice processing.

[2] Propagation of Taint Information

[2-1] Outline

In this embodiment, when data is input from outside the computer system, the taint bit of the data is set. The taint information is propagated from the dependence source to the dependence destination in accordance with dependence of the program. When data is output, it is checked whether or not a taint bit of the data is set, i.e., whether or not the data is tainted.

Here, in the propagation of the taint bits, a time series consisted of events of reading and writing in the execution of the program is checked, and when it is determined that the processing is of the free-form processing (for example, when tainted data is read during each event of writing which is the output to the character string), propagation of the taint bit is performed.

The expression "when it is determined that the processing is of the free-form processing" implies partial series of the time series satisfying the following first condition and second condition. In this case, propagation of the taint bit is performed with respect to the character string data of the write-object of the first condition.

First condition: All the events of writing to one character string should be included in the partial series of the time series. Here, a case where it is detected by a character string detector that the event of writing is for one character string is also included.

Second condition: The time series should be consisted of two or more partial series groups each of which is consisted of a first partial series and a second partial series subsequent to the first partial series.

First partial series: The first partial series includes one or more events of reading of tainted data, and does not include an event of writing of the first condition.

Second partial series: The second partial series includes one or more events of writing of the first condition, and does not include an event of reading of tainted data.

In such propagation of taint information, when an event of reading of data which is not tainted is expressed as r, an event of reading of tainted data, as R, an event of writing not to the character string of the first condition, as w, and an event of writing to a part of the character string of the first condition, as W, the partial series satisfying the above second condition can be expressed by the regular expression of the following expression (1).

$$([\tilde{\ }W]^*R[\tilde{\ }W]^*[\tilde{\ }R]^*W[\tilde{\ }R]^*)([\tilde{\ }W]^*R[\tilde{\ }W]^*[\tilde{\ }R]^*W[\tilde{\ }R]^*)+ \qquad (1)$$

[2-2] State Transition Diagram

FIG. 1 is a state transition diagram of an automaton for accepting the same series as the regular expression of the expression (1). In FIG. 1, a circle indicates a state, and an arrow indicates a state transition. When a symbol written adjacent to an arrow is input, a transition from the state at the proximal part of the arrow to the state at the distal part of the arrow is effected.

The automaton is in the initial state $S_0$ at first, and repeats state transition in accordance with a symbol of a series input in sequence. After the input of the last symbol of the series, if the automaton is in an acceptance state $S_4$, the series is accepted.

More specifically, in the initial state $S_0$, when reading r of data which is not tainted, or writing w not to the character string of the first condition is input, a transition to state $S_0$ is effected again, and when reading R of tainted data is input, a transition to state $S_1$ is effected.

In state $S_1$, when reading r of data which is not tainted, reading R of tainted data, or writing w not to the character string of the first condition is input, a transition to state $S_1$ is effected again, and when writing W to a part of the output of the character string of the first condition is input, a transition to state $S_2$ is effected.

In state $S_2$, when reading r of data which is not tainted, writing w not to the character string of the first condition, or writing W to a part of the character string of the first condition is input, a transition to state $S_2$ is effected again, and when reading R of tainted data is input, a transition to state $S_3$ is effected.

In state $S_3$, when reading r of data which is not tainted, reading R of tainted data, or writing w not to the character string of the first condition is input, a transition to state $S_3$ is effected again, and when writing W to a part of the character string of the first condition is input, a transition to state $S_4$ is effected.

In state $S_4$, when reading r of data which is not tainted, writing w not to the character string of the first condition, or writing W to a part of the character string of the first condition is input, a transition to state $S_4$ is effected again, and when reading R of tainted data is input, a transition to state $S_5$ is effected.

In state $S_5$, when reading r of data which is not tainted, reading R of tainted data, or writing w not to the character string of the first condition is input, a transition to state $S_5$ is effected again, and when writing W to part of the character string of the first condition is input, a transition to state $S_4$ is effected.

As described above, according to this embodiment, taint information is propagated to the series of the symbol expressed by the regular expression of the expression (1), the series of the symbol accepted by the automaton expressed by the state transition diagram of FIG. 1, and the character string data which is the object of writing W to a part of the character string of the first condition.

[2-3] Specific Examples

FIG. 2 shows specific examples (Example 1-a to c) of partial series in which propagation of taint information is performed, and specific examples (Examples 2-a to b) of partial series in which propagation of taint information is not performed. In each of the examples, reading of tainted data is indicated by R, and writing to a part of the character string of the first condition is indicated by W. Further, (1) and (2) in FIG. 2 correspond to the first partial series and second partial series of the second condition, respectively. It should be noted that in FIG. 2, although only R and W are shown for the sake of simplification, any number of r (reading of data which is not tainted) and w (writing not to the character string of the first condition) may appear at arbitrary positions.

Example 1-a is the simplest example in which propagation of taint information is performed. Two partial series groups each of which has a first partial series (1) constituted of one R, and a second partial series (2) constituted of one W are continuous. As a result of this, Example 1-a satisfies the second condition described above.

Example 1-b, like Example 1-a, includes partial series groups each of which has a first partial series (1) constituted of one R, and a second partial series (2) constituted of one W. Further, four of such partial series groups continue in Example 1-b. As a result of this, Example 1-b satisfies the second condition described above. This Example 1-b is a typical example of the free-form processing.

Example 1-c is an example in which the numbers of R and W included in the respective partial series are different from each other. The first partial series group includes a first partial series (1) constituted of one R, and a second partial series (2) constituted of one W. The second partial series group includes a first partial series (1) constituted of two Rs, and a second partial series (2) constituted of one W. The third partial series group includes a first partial series (1) constituted of one R, and a second partial series (2) constituted of three Ws. Even Example 1-c in which the numbers of R and W included in the respective partial series are different from each other as described above satisfies the above-mentioned second condition.

On the other hand, Example 2-a and Example 2-b are examples in which two or more partial series groups are not continuous. In Example 2-a, only a first partial series (1) constituted of one R, and a second partial series constituted of one W are present, and the partial series group does not continue. Accordingly, the half part of the second condition "the series should be constituted of a series of two or more partial series groups" is not satisfied, and hence propagation of taint bit is not performed. Likewise, in Example 2-b, only a first partial series (1) constituted of one R, and a second partial series (2) constituted of four Ws are present, and the partial series group does not continue. Accordingly, the half part of the second condition "the series should be constituted of a series of two or more partial series groups" is not satisfied, and hence propagation of taint bit is not performed. This Example 2-b is a typical example of the n-fold choice processing.

[3] Information Processing Device

Figure 4:
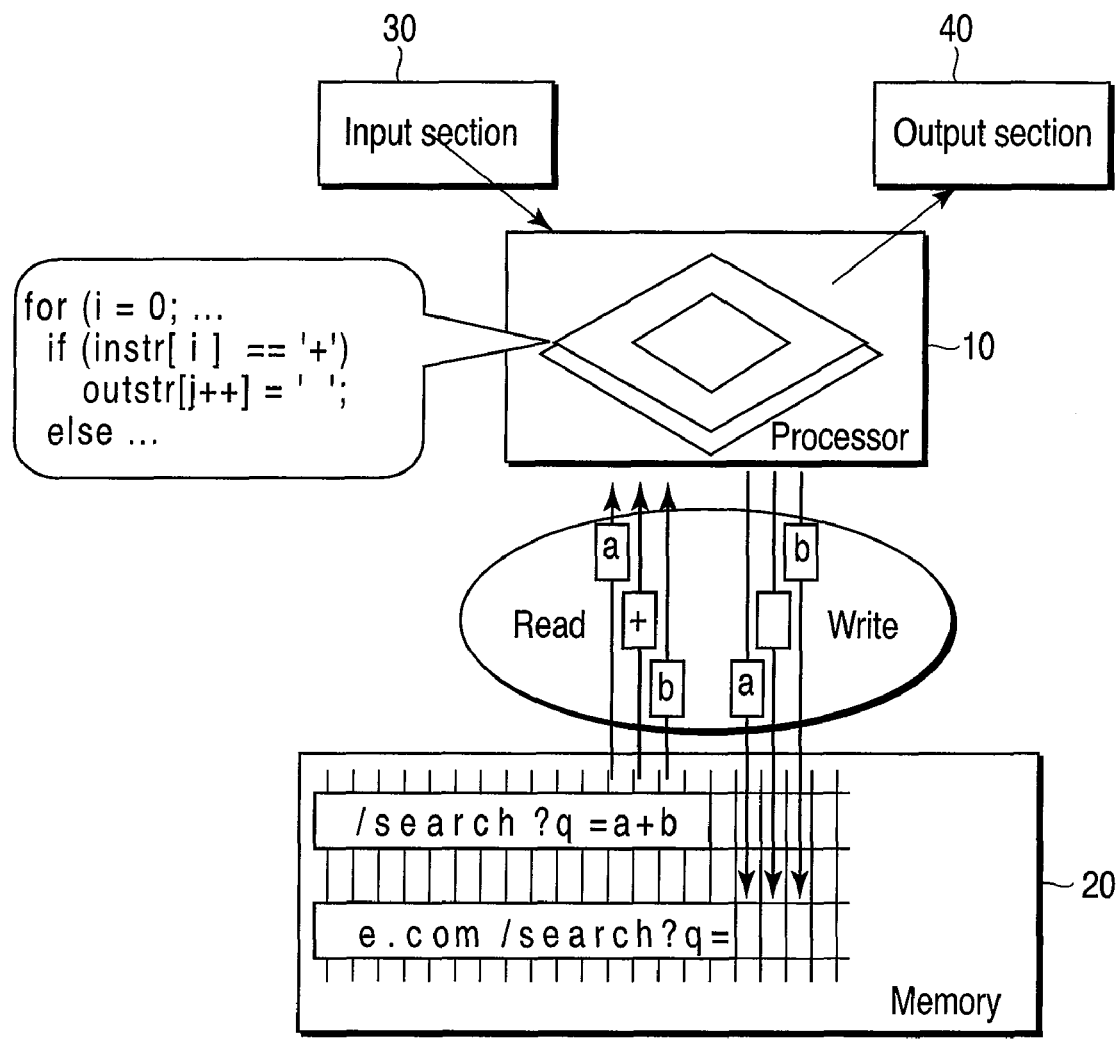
FIG. 4 is a block diagram showing the second example of the information processing device according to the first embodiment.

FIGS. 3 and 4 show block diagrams of an information processing device for realizing propagation of taint information of this embodiment. An information processing device 1 shown in FIGS. 3 and 4 includes a processor 10, memory (storage section) 20, input section 30, and output section 40. The processor 10 includes a read detection section 11, write detection section 12, taint bit addition section 13, and inspection section 14. The memory 20 includes a first storage section 21 in which character string data which is input from outside, and to which taint information is added is stored, and a second storage section 22 in which character string data that has already been subjected to processing is stored. It should be noted that the first storage section 21, and second storage section 22 may be stored in separate memories.

In the information processing device 1 of this embodiment, the following information processing is performed.

First, data is input from outside the information processing device 1 to the input section 30. This data is input to the processor 10, and is then stored in the first storage section 21 in a state where a taint bit is added (set) to each data item included in the data by the taint bit addition section 13.

When a program is executed, the processor 10 performs reading from the first storage section 21, and performs writing to the second storage section 22. At this time, reading R of the data (taint data) in which a taint bit is set is detected by the read detection section 11, and writing W of data d' included in the character string data D is detected by the write detection section 12.

Here, when first reading R1 of taint data d1, first writing W1 of data d1' included in the character string data D, second reading R2 of taint data d2, and second writing W2 of data d2' included in the character string data D are detected in sequence in the order mentioned above, a taint bit is added (set) to each of data d1' of the first writing W1, and data d2' of the second writing W2 by the taint bit addition section, and the resultant data items are stored in the second storage section 22.

Further, when the data stored in the second storage section 22 is read by the output section 40, it is checked by the inspection section 14 of the processor 10 whether or not the output data is the taint data.

It should be noted that in the information processing described above, the data d1' of the first writing W1 may be the taint data d1 of the first reading R1, or may be data other than the taint data d1. Likewise, the data d2' of the second writing W2 may be the taint data d2 of the second reading R2, or may be data other than the taint data d2. The data items d1' and d2' of the first writing W1 and second writing W2 are for arbitrary two parts of the character string data D, and the data items d1' and d2' may be arbitrary parts of the character string data D which are continuous with each other, or may be parts which are not continuous with each other.

Further, data of each of the first reading R1 and second reading R2 is not limited to character string data. The data items of the first reading R1 and second reading R2 may be identical with each other, or may be different from each other.

Figure 5:
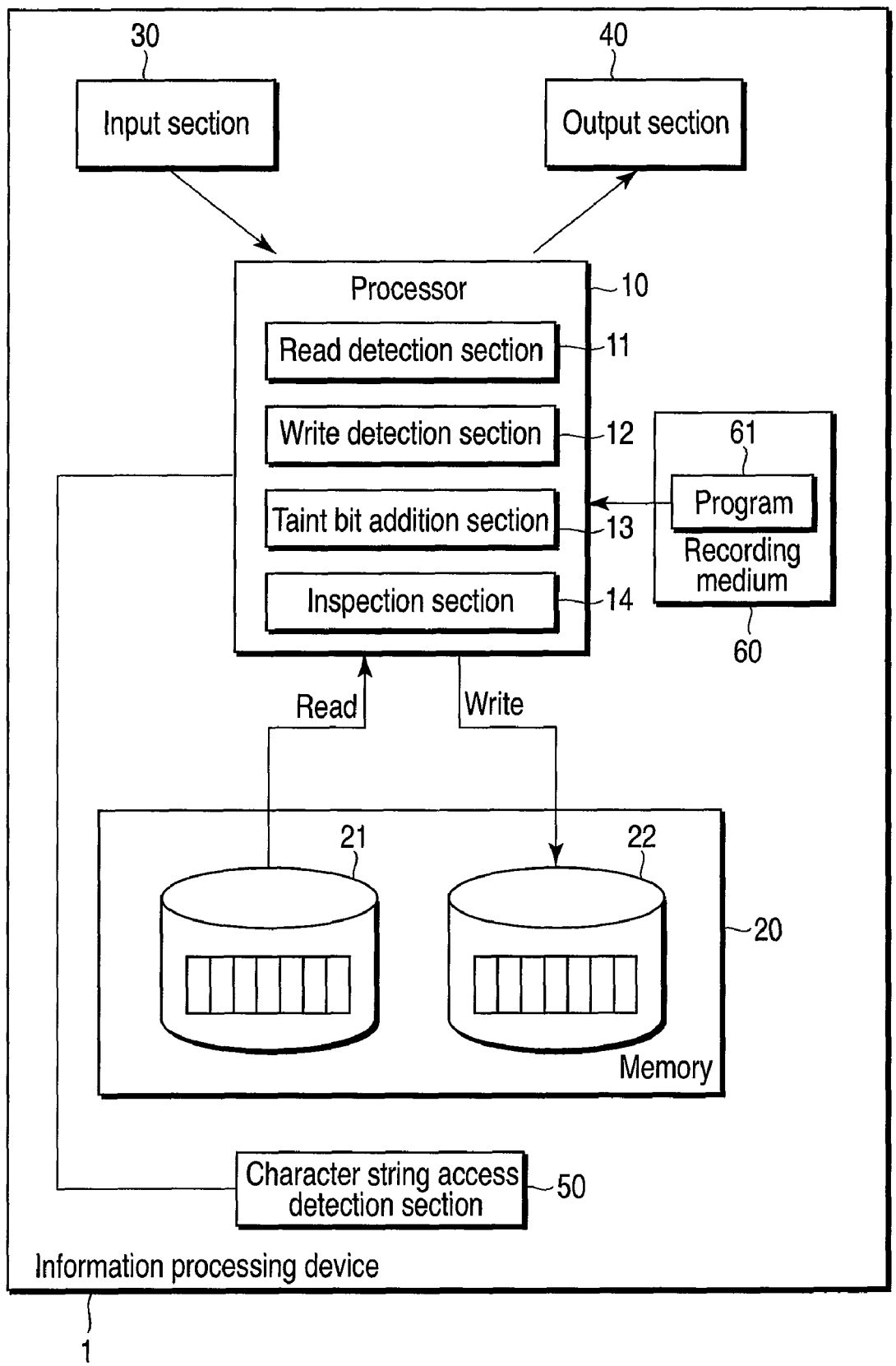
FIG. 5 is a block diagram showing the third example of the information processing device according to the first embodiment.

Further, the information processing device 1 of this embodiment may further include a character string access detection section 50 as shown in FIG. 5. This character string access detection section 50 receives an address trace included in a time series (sequence) of reading/writing (loading/storing) instructions to be executed by the processor 10 as an input, and detects a partial series comprising the character string access basis of the input address trace.

More specifically, as shown in FIG. 6, it is determined by the character string access detection section 50 whether or not the data is character string data (ST1). As a result of this, when the data is character string data, it is further determined whether or not the character string data is an object for which propagation of taint information is to be performed (ST2). When the character string data corresponds to the object, propagation of the taint information is performed (ST3). On the other hand, when the data is not character string data, or when the character string data is not the object for which propagation of the taint information is to be performed, propagation of the taint information is not performed (ST4). It should be noted that it is determined by the processor 10 as described above whether or not the character string data is an object for which propagation of taint information is to be performed.

By utilizing the character string access detection section 50 described above, it is possible to implement this embodiment in the platform such as the processor 10 or the VM. It should be noted that in the case where the character string access can be easily recognized, i.e., in the case of the scripting language processing system or the like, it is not necessary to use the character string access detector. Here, the function of the character string access detection section 50 may be carried out by the processor 10.

It should be noted that it is also possible to apply the information processing such as propagation of the taint information of this embodiment described above as a program 61 that can cause the processor 10 of the information processing device 1 or, for example, a computer to realize the information processing (see FIGS. 3 and 5). It is also possible to apply this program 61 to various devices by writing the program to a recording medium 60 such as a magnetic disk, optical disk, semiconductor memory, and the like, or apply the program 61 to various devices by transmitting the program through a communication medium. The program 61 recorded on the recording medium 60 is read by the computer, and the operation of the computer is controlled by the program 61, whereby the information processing of this embodiment described above is executed.

[4] Advantage

As has been described above, according to this embodiment, unlike the prior art in which propagation has been performed for microscopic units such as sentences or instructions, taint information is propagated for each character string operation by the processor. Accordingly, it is possible to realize propagation of taint information with a high accuracy, and prevent false detections (false positive) and detection leakages (false negative) of the injection attack from occurring, and hence it becomes possible to construct a server having high resistance against attack.

Further, the present invention is language-independent like DIFT, and hence can be implemented on execution platforms such as processors or VMs. Therefore, the platform has resistance against attacks, and hence it becomes unnecessary to take care of security holes of application programs.

The Second Embodiment

The information processing device according to the present embodiment uses algorithm different from the information processing device according to the first embodiment to propagate taint information.

Figure 7:
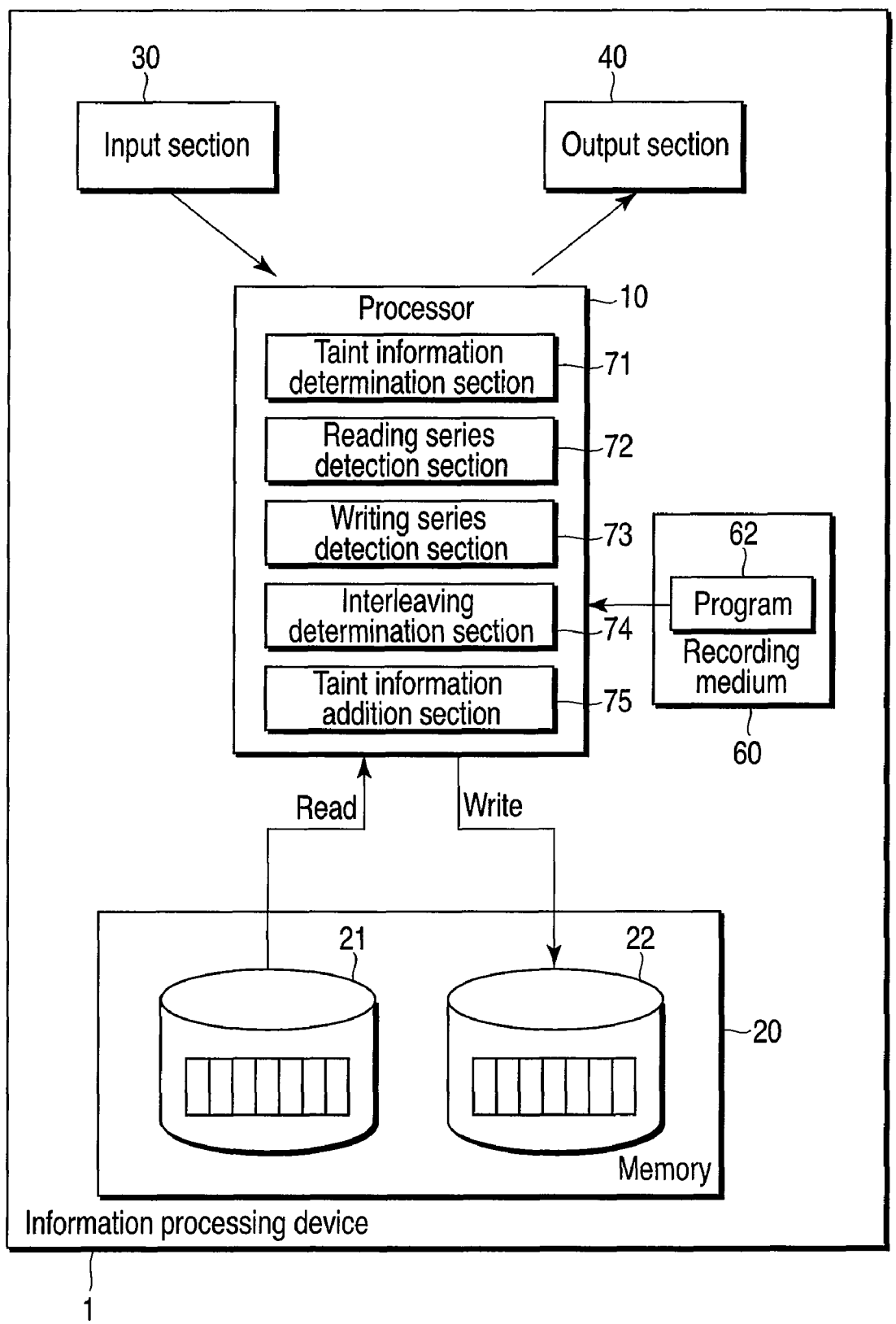
FIG. 7 is a block diagram showing an illustrative configuration of an information processing device according to the second embodiment of the present invention.

FIG. 7 is a block diagram showing an illustrative configuration of the information processing device according to the present embodiment.

In the algorithm according to the present embodiment, the processor 10 determines whether an interleaving relationship occurs between reading events of character string data which has taint information added thereto and is stored in the first storage section 21 and writing events of character string data into the second storage section 22.

Then, the processor 10 adds taint information to character string data which is stored into the second storage section 22 through a writing event which occurs in interleaving manner with a reading event of character string data with taint information added thereto.

Specific algorithm will now be described.

In the algorithm according to the present embodiment, the following condition is assumed;

t being a threshold satisfying $t \geq 2$, $k \geq 1$, $mk1, mk2, \ldots, mkt \geq 1$, $n1, n2, \ldots, nt \geq 1$.

It is assumed that there is a series of reading to a character string Rk for a series of writing to a character string W. It is also assumed that the series of writing to the character string W is:

$w\_1\_1, w\_1\_2, \ldots, w\_1\_n1$, $w\_2\_1, w\_2\_2, \ldots, w\_2\_n2$,

. . .

$w\_t\_1, w\_t\_2, \ldots, w\_t\_nt$ and, the series of reading to the character string Rk is:

$rk\_1\_1, rk\_1\_2, \ldots, rk\_1\_mk1$, $rk\_2\_1, rk\_2\_2, \ldots, rk\_2\_mk2$,

. . .

$rk\_t\_1, rk\_t\_2, \ldots, rk\_t\_mkt$,

. . . .

Then, when this reading series and this writing series have an interleaving relationship wherein $rk\_1\_1, rk\_1\_2, \ldots, rk\_1\_mk1$, $w\_1\_1, w\_1\_2, \ldots, w\_1\_n1$, $rk\_2\_1, rk\_2\_2, \ldots, rk\_2\_mk2$, $w\_2\_1, w\_2\_2, \ldots, w\_2\_n2$,

. . .

$rk\_t\_1, rk\_t\_2, \ldots, rk\_t\_mkt$, $w\_t\_1, w\_t\_2, \ldots, w\_t\_nt$

. . .

occur in the mentioned order, then taint information for the reading event which occurs last in $r1\_i\_m1i, r2\_i\_m2i, \ldots (i \geq 1)$ is propagated to writing events of $w\_i\_1, w\_i\_2, \ldots, w\_i\_ni$.

The processor 10 provided in the information processing apparatus 70 reads out a program 62 for realizing the above-mentioned algorithm from the recording medium 60 and executes it.

With this execution, the processor 10 serves as a taint information determination section 71, a reading series detection section 72, a writing series detection section 73, an interleaving determination section 74, and a taint information addition section 75.

The taint information determination section 71 determines whether a character string data read from the first storage section 21 has taint information added thereto.

The reading series detection section 72 detects a series of reading of character string data with taint information added thereto from the first storage section 21 on the basis of the determination result from the taint information determination section 71. A reading series includes reading events to character string data which is stored in the first storage section 21 and has taint information added thereto. The reading series detection section 72 detects, records, and manages occurrence timings of reading events to character string data with taint information added thereto.

The writing series detection section 73 detects a series of writing for storing write-object data into the second storage section 22. A writing series includes writing events to data which is written into the second storage section 22. The writing series detection section 73 also detects, records, and manages occurrence timings of writing events to data to be written into the second storage section 22.

The interleaving determination section 74, on the basis of the reading series detected by the reading series detection section 72 and its occurrence timing and the writing series detected by the writing series detection section 73 and its occurrence timing, determines whether the interleaving relationship is satisfied between reading event groups which are included in the reading series and each of which includes one or more sequential reading events and writing event groups which are included in the writing series and each of which includes one or more sequential writing events.

For example, it is assumed that the reading series for character string data which is determined to have taint information added thereto includes a first reading event group which includes one or more sequential reading events, and a following second reading event group which includes one or more sequential reading events, and similar repetition is made.

Further, it is assumed that the writing series includes a first writing event group which includes one or more sequential writing events, and a following second writing event group which includes one or more sequential writing events, and similar repetition is made.

Under this assumption, the interleaving determination section 74 determines the occurrence of the interleaving relationship when the first reading event group is followed by the occurrence of the first writing event group, and, after the first writing event group, the second reading event group is followed by the occurrence of the second writing event group. After this, the interleaving determination section 74 repeats similar determination while it staggers a determination-object reading event group and a determination-object writing event group.

The detection by the reading series detection section 72, detection by the writing series detection section 73, and determination by the interleaving determination section 74 may be implemented, for example, by combination of control statements of various kinds, pattern recognition technique of various kinds, or pattern classification.

The taint information addition section 75 adds taint information to write-object character string data when the interleaving determination section 74 determines the occurrence of interleaved reading and writing on character string data with taint information added thereto.

For example, when it is determined that the interleaving occurs to the first writing event group and the second writing event group, the taint information addition section 75 adds taint information to all character string data to be written by writing events in the first writing event group and all character string data to be written by writing events in the second writing event group.

For example, when a writing event involving addition of taint information occurs for more than one reading events, the taint information addition section 75 adds tracking information for the reading event which occurs last among these reading events to the write-object character string data.

Figure 8:
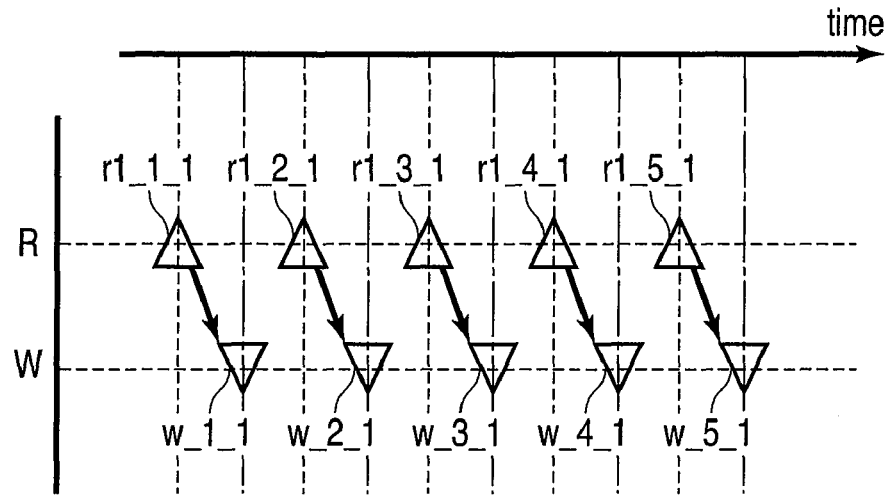
FIG. 8 is a diagram showing the first example of propagation of taint information by an algorithm according to the second embodiment.

FIG. 8 is a diagram showing a first example of propagation of taint information by the algorithm according to the present embodiment.

In FIG. 8, the horizontal axis represents time when reading events and writing events occur. The vertical axis represents types of reading character string data and writing character string data. Arrows in FIG. 8 indicates the propagation of taint information.

The reading series which includes reading events $r1\_1\_1, \ldots, r1\_5\_1$ occurs to the read character string data R in FIG. 8.

Reading event groups $(r1\_1\_1), \ldots, (r1\_5\_1)$ include $r1\_1\_1, \ldots, r1\_5\_1$, respectively, in FIG. 8.

The writing series which includes writing events $w\_1\_1, \ldots, w\_5\_1$ occurs to the write character string data W in FIG. 8. Writing event groups $(w\_1\_1), (w\_5\_1)$ include $w\_1\_1, \ldots, w\_5\_1$, respectively, in FIG. 8.

The occurrence timings result in satisfaction of the interleaving relationship between reading event groups $(r1\_1\_1), \ldots, (r1\_5\_1)$ and writing event groups $(w\_1\_1), \ldots, (w\_5\_1)$, respectively. That is, reading event groups $(r1\_1\_1), \ldots, (r1\_5\_1)$ and writing event groups $(w\_1\_1), \ldots, (w\_5\_1)$ satisfy the relationship of alternating occurrence, respectively.

Then, in writing events to the write character string data W in writing event groups $(w\_1\_1), \ldots, (w\_5\_1)$, taint information for the last (latest) reading event in respective reading event groups which occur just before and have the interleaving relationship with respective writing event groups is added to the write character string data.

Figure 9:
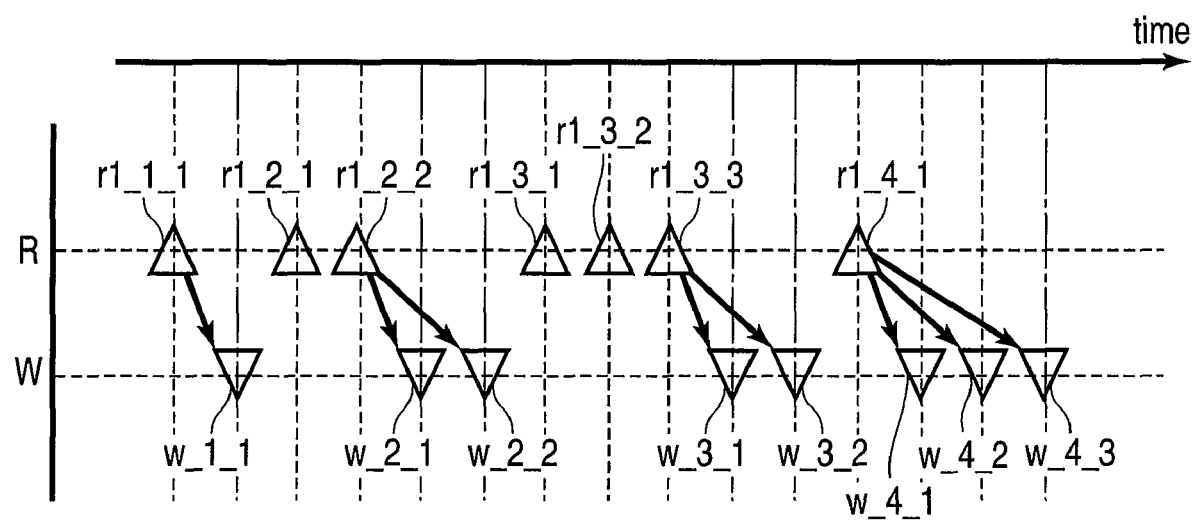
FIG. 9 is a diagram showing the second example of propagation of taint information by the algorithm according to the second embodiment.

FIG. 9 is a diagram showing a second example of propagation of taint information by the algorithm according to the present embodiment.

The reading series which includes reading events $r1\_1\_1, r1\_2\_1, r1\_2\_2, \ldots, r1\_4\_1$ occurs to the read character string data R in FIG. 9.

Reading event groups in FIG. 9 are $(r1\_1\_1), (r1\_2\_1, r1\_2\_2), (r1\_3\_1, r1\_3\_2, r1\_3\_3)$, and $(r1\_4\_1)$.

The writing series which includes writing events $w\_1\_1, w\_2\_1, w\_2\_2, \ldots, w\_4\_3$ occurs to the write character string data W in FIG. 9.

Writing event groups in FIG. 9 are $(w\_1\_1), (w\_2\_1, w\_2\_2), (w\_3\_1, w\_3\_2)$, and $(w\_4\_1, w\_4\_2, w\_4\_3)$.

The occurrence timings result in satisfaction of the interleaving relationship between reading event groups $(r1\_1\_1), (r1\_2\_1, r1\_2\_2), (r1\_3\_1, r1\_3\_2, r1\_3\_3)$, and $(r1\_4\_1)$ and writing event groups $(w\_1\_1), (w\_2\_1, w\_2\_2), (w\_3\_1, w\_3\_2)$, and $(w\_4\_1, w\_4\_2, w\_4\_3)$, respectively. That is, reading event groups $(r1\_1\_1), (r1\_2\_1, r1\_2\_2), (r1\_3\_1, r1\_3\_2, r1\_3\_3)$, and $(r1\_4\_1)$ and writing event groups $(w\_1\_1), (w\_2\_1, w\_2\_2), (w\_3\_1, w\_3\_2)$, and $(w\_4\_1, w\_4\_2, w\_4\_3)$ satisfy the relationship of alternating occurrence, respectively.

Then, in writing events in writing event groups $(w\_1\_1), (w\_2\_1, w\_2\_2), (w\_3\_1, w\_3\_2)$, and $(w\_4\_1, w\_4\_2, w\_4\_3)$, taint information for the last (latest) reading event in respective reading event groups which occur just before and have the interleaving relationship with respective writing event groups is added to the write character string data.

Figure 10:
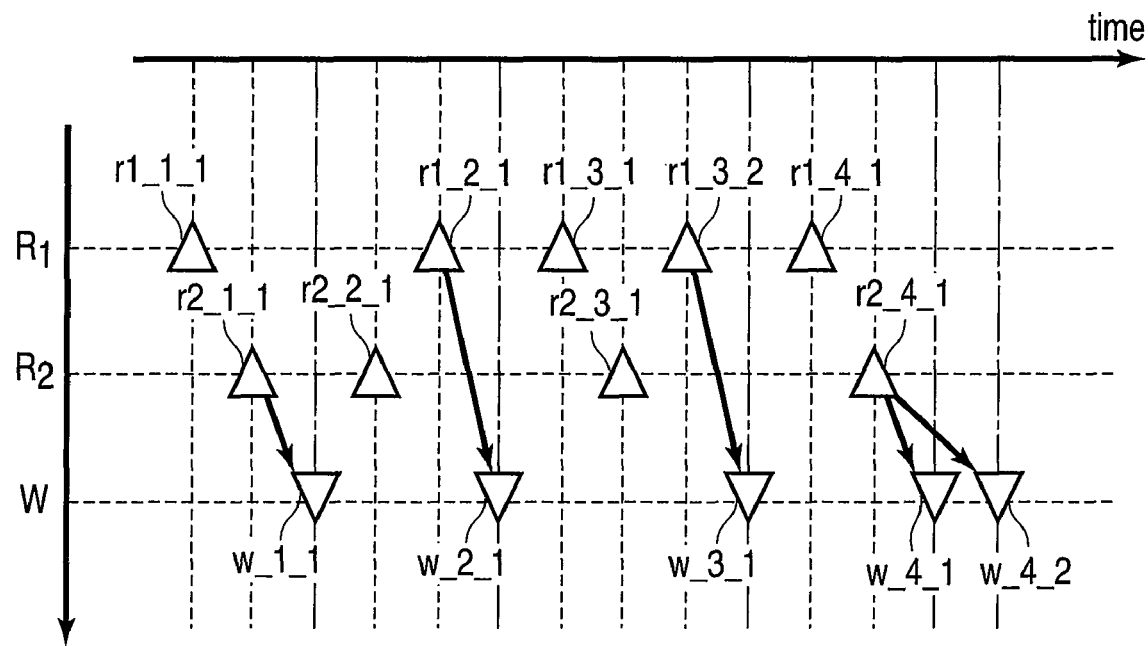
FIG. 10 is a diagram showing the third example of propagation of taint information by the algorithm according to the second embodiment.

FIG. 10 is a diagram showing a third example of propagation of taint information by the algorithm according to the present embodiment.

The reading series which includes reading events $r1\_1\_1, r1\_2\_1, r1\_3\_1, r1\_3\_2$, and $r1\_4\_1$ occurs to the read character string data R1.

Reading event groups in the reading series of the read character string data R1 are (r1_1_1), (r1_2_1), (r1_3_1, r1_3_2), and (r1_4_1).

The reading series which includes reading events r2_1_1, r2_2_1, r2_3_1, and r2_4_1 occurs to the read character string data R2.

Reading event groups in the reading series of the read character string data R2 are (r2_1_1), (r2_2_1), (r2_3_1), and (r2_4_1).

The writing series which includes writing events w_1_1, w_2_1, w_3_1, w_4_1, and w_4_2 occurs to the write character string data W.

Writing event groups are (w_1_1), (w_2_1), (w_3_1), (w_4_1), and (w_4_2).

The occurrence timings result in satisfaction of the interleaving relationship between reading event groups for the read character string data R1 (r1_1_1), (r1_2_1), (r1_3_1, r1_3_2), and (r1_4_1) and writing event groups for the write character string data W (w_1_1), (w_2_1), (w_3_1), and (w_4_1, w_4_2), respectively.

Further, the occurrence timings also result in satisfaction of the interleaving relationship between reading event groups for the read character string data R2 (r2_1_1), (r2_2_1), (r2_3_1), and (r2_4_1) and writing event groups for the write character string data W (w_1_1), (w_2_1), (w_3_1), and (w_4_1, w_4_2), respectively.

Then, in writing events in writing event groups (w_1_1), (w_2_1), (w_3_1), and (w_4_1, w_4_2), taint information for the last (latest) reading event in, of reading event groups of the read character string data R1 and R2, respective reading event groups which occur just before and have the interleaving relationship with respective writing event groups is added to the write character string data.

In the example of FIG. 10, taint information for the reading event r2_1_1 is added to the character string data for the writing event w_1_1. Taint information for the reading event r1_2_1 is added to the character string data for the writing event w_2_1. Taint information for the reading event r1_3_2 is added to the character string data for the writing event w_3_1. Taint information for the reading event r2_4_1 is added to the character string data for writing events w_4_1 and w_4_2.

Figure 11:
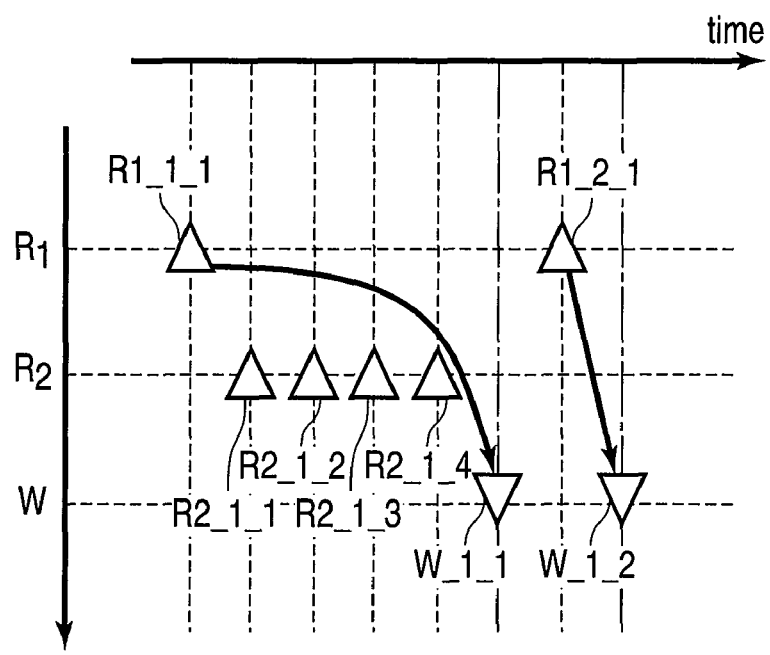
FIG. 11 is a diagram showing the fourth example of propagation of taint information by the algorithm according to the second embodiment.

FIG. 11 is a diagram showing a fourth example of propagation of taint information by the algorithm according to the present embodiment.

The reading series which includes reading events r1_1_1 and r1_2_1 occurs to the read character string data R1.

Reading event groups in the reading series of the read character string data R1 are (r1_1_1) and (r1_2_1).

The reading series which includes reading events r2_1_1, r2_1_2, r2_1_3, and r2_1_4 occurs to the read character string data R2.

The writing series which includes writing events w_1_1 and w_2_1 occurs to the write character string data W.

Writing event groups are (w_1_1) and (w_2_1).

The occurrence timings result in satisfaction of the interleaving relationship between reading event groups for the read character string data R1 (r1_1_1) and (r1_2_1) and writing event groups for the write character string data W (w_1_1) and (w_2_1), respectively.

However, the reading series to the read character string data R2 and the writing series to the write character string data W do not satisfy the interleaving relationship.

Then, in writing events in writing event groups (w_1_1) and (w_2_1), taint information for the last (latest) reading event in, of reading groups of the read character string data R1, respective reading event groups which occur just before and have the interleaving relationship with respective writing event groups is added to the write character string data.

In the example of FIG. 11, taint information for the reading event r1_1_1 is added to the character string data for the writing event w_1_1. Taint information for the reading event r1_2_1 is added to the character string data for the writing event w_1_2.

As described above, in the present embodiment, it is determined that the interleaving relationship occurs when occurrence of at least one reading event to character string data with taint information added thereto is followed by occurrence of at least one write event, and then occurrence of at least one reading event to the character string data with taint information is followed by occurrence of at least one write event. Then, similar determination is repeated.

For propagation of taint information in writing, taint information is propagated based on the last reading in at least one reading which occurs just before the writing.

In the present embodiment thus described can accurately propagate taint information even to character string data created based on character string data from outside by the information processing apparatus 71. This can build the information processing apparatus 71 with high resistance against attacks.

The Third Embodiment

In this embodiment, we describe a specific algorithm that realizes propagation of taint information. There are two stages to this algorithm, a character string access detection stage, and a propagation stage using the result of the character string access detection.

[Character String Access Detection]

In this section, we describe the operation of a character string detector, which detects character string access. The character string detector outputs the following two pieces of information responding to a provided address. Note that the character string detector can be realized by a processor. The two pieces of information are;

1. Whether the access is to a character string or not
2. Whether a backtrack, an operation we will describe later, is necessary There are two character string detectors for detecting load and store to character strings respectively. The two character string detectors detect character strings access using the same algorithm.

Each character string detector detect character stings using a character string detection table. Entries in the character string detection table are shown in FIG. 12. Each entry in the character string detection table holds information on a character string access.

[Update and Detection of Entries]

Upon execution of load and store instructions, the character string detector detects the character string access by the operation described in the following section. This operation is performed on all entries in the character string detection table that each character string detector provides.

Figure 13:
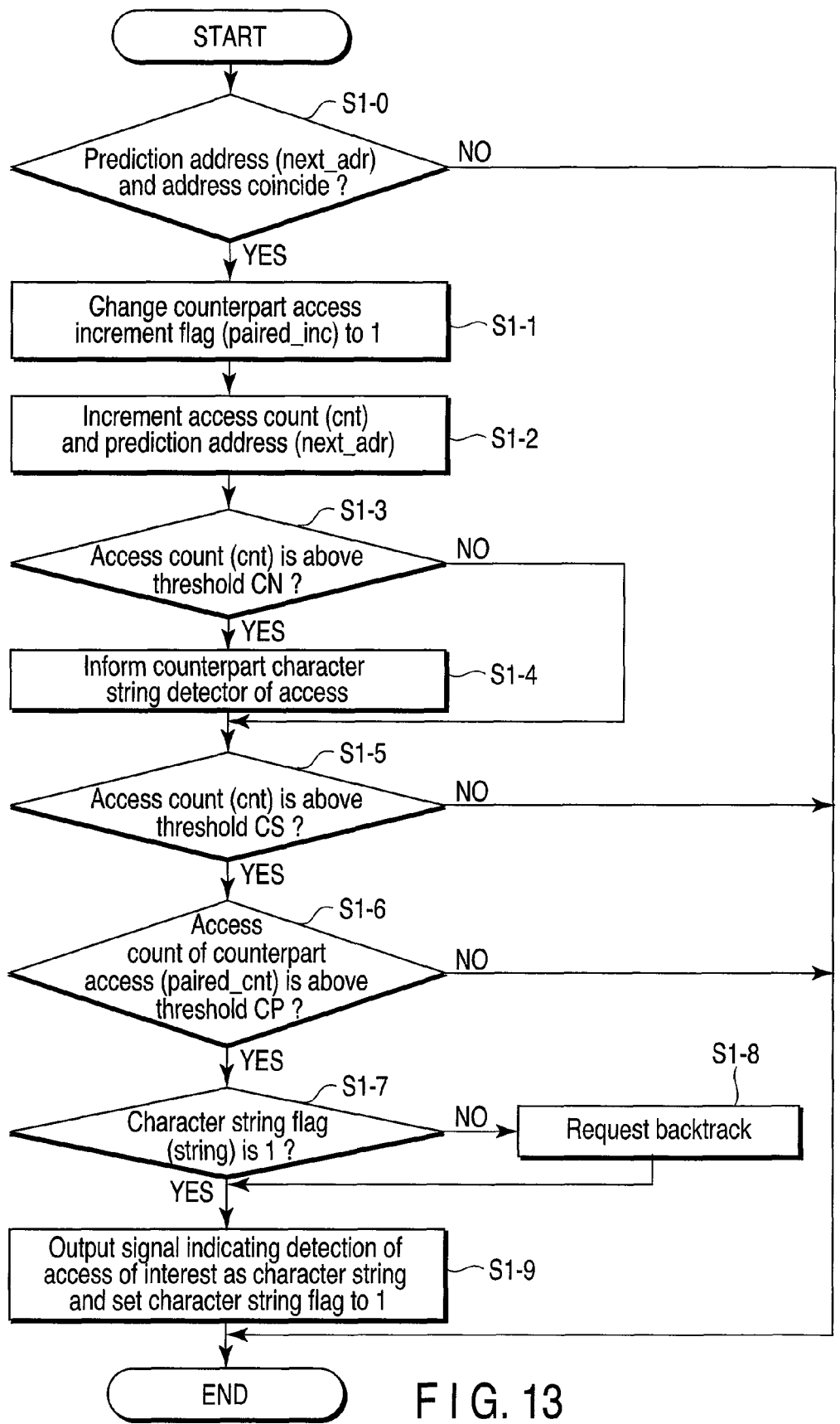
FIG. 13 is a flowchart showing an example of a character string detection operation being performed on each entry.

FIG. 13 is a flowchart showing an example of character string detection according to the present embodiment. The character string detection in FIG. 13 is performed on each entry in the character string detection tables.

First, in step S1-0, the predicted address (next_adr) and the accessed address are compared. When these addresses do not match, the process on the entry terminates.

If two addresses matched in step S1-0, the following operations are performed. In step S1-1, the access increment flag (paired_inc) is updated to 1. Then in step S1-2, the access count (cnt) and the prediction address (next_adr) are incremented.

Next in step S1-3, whether the access count (cnt) is above a threshold CN is determined. If the access count (cnt) is above the threshold CN, the following operations are performed in step S1-4. If the access is load, the detector for store is notified of the access. If the access is store, the detector for load is notified of the access. The accesses are handled by their counterpart detectors, the store detector for load access, and vice versa. We describe the operation of these detectors upon the notification later.

Next in step S1-5, whether the access count (cnt) is above a threshold CS is determined. When the access count (cnt) is not above the threshold CS, the process on the entry terminates. If the access count (cnt) is above the threshold CS, whether the counterpart character string access count (paired_cnt) is above a threshold CP is determined in step S1-6. When the access count paired_cnt is not above the threshold CP, the process on the entry terminates.

if the access count paired_cnt was above the threshold CP, it is then determined whether the character string flag (string) is 1 in step S1-7. When the character string flag is 0, the backtrack request is output in step S1-8.

Next, in step S1-9, a signal that a character string is detected is output, and the character string flag (string) is updated to 1.

[Addition of Entry]

When there is no table entry with prediction address (next_adr) that matches the accessed address, a new entry is added to the table. The fields of the added entry are initialized as follows.

base_adr: the accessed address
next_adr: base_adr+1
cnt: 1
all other fields: 0

Note that, since the table size is limited, replacement based on LRU algorithm is performed when there are no available entries.

[Notification from Counterpart Character String Detector]

Figure 14:
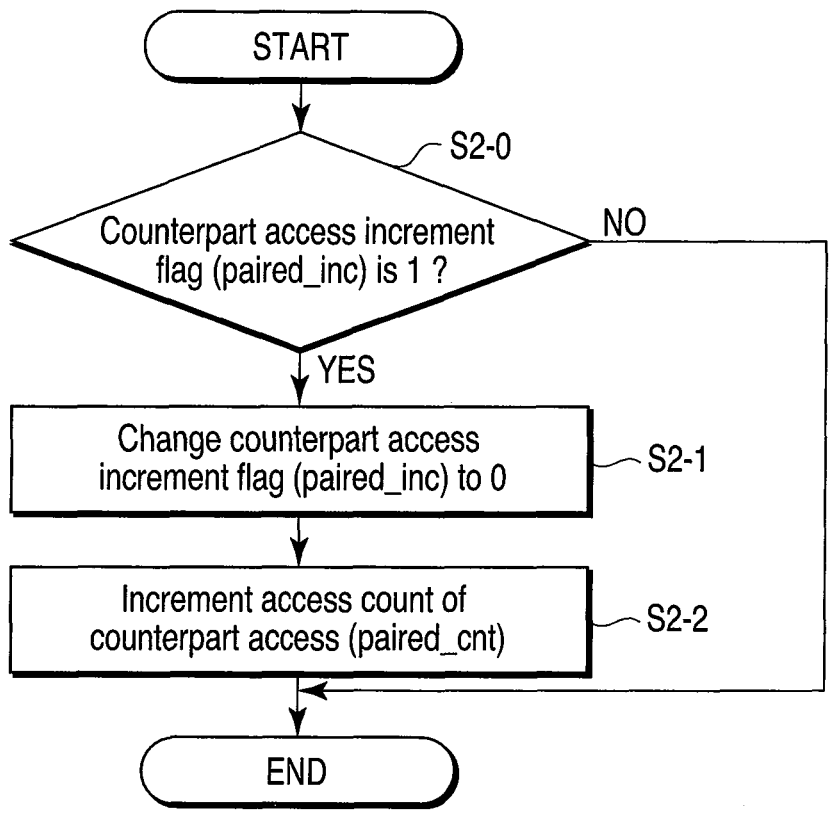
FIG. 14 is a flowchart of illustrative operation of a recipient of access according to the third embodiment.

FIG. 14 shows an example of the operation of the counterpart detector upon the notification in the step S1-4. The operation is carried out on all entries in the character string detection table in the counterpart detector.

First, in step S2-0, it is determined whether the counterpart access increment flag (paired_inc) is 1. When the flag (paired_ inc) is 0, the process on the entry terminates.

When the flag (paired_inc) is 1 in step S2-0, the flag (paired_inc) is updated to 0 in step S2-1, and the counterpart character string access count (paired_cnt) is incremented.

[Propagation]

Taint information propagation is realized by an operation at the time of execution of load and store instructions. This operation is based on output from the character string detectors for load and store described above, and carried out by, for example, a processor. The character string detectors for load and store can be included in the processor or separate from the processor.

[Operation on Execution of Load Instruction]

Figure 15:
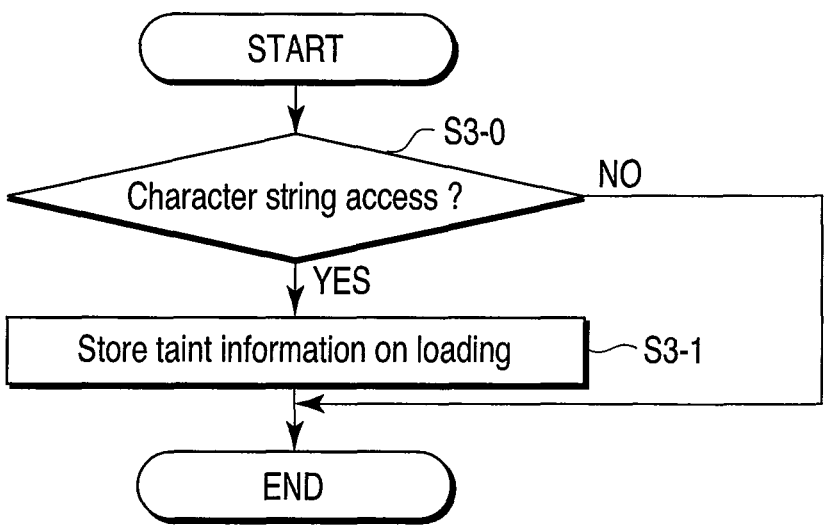
FIG. 15 is a flowchart showing an illustrative operation on execution of loading instruction according to the third embodiment.

FIG. 15 shows an example of the operation at the time of execution of a load instruction.

First, the character string detector determines whether the access is to a character string in step S3-0. When the access is not to a character string, the process terminates here.

When the access is to a character string, taint information corresponding to the address is loaded and saved for later use.

Note that the step S3-1 is executed by, for example, a processor.

[Operation on Execution of Store Instruction]

Figure 16:
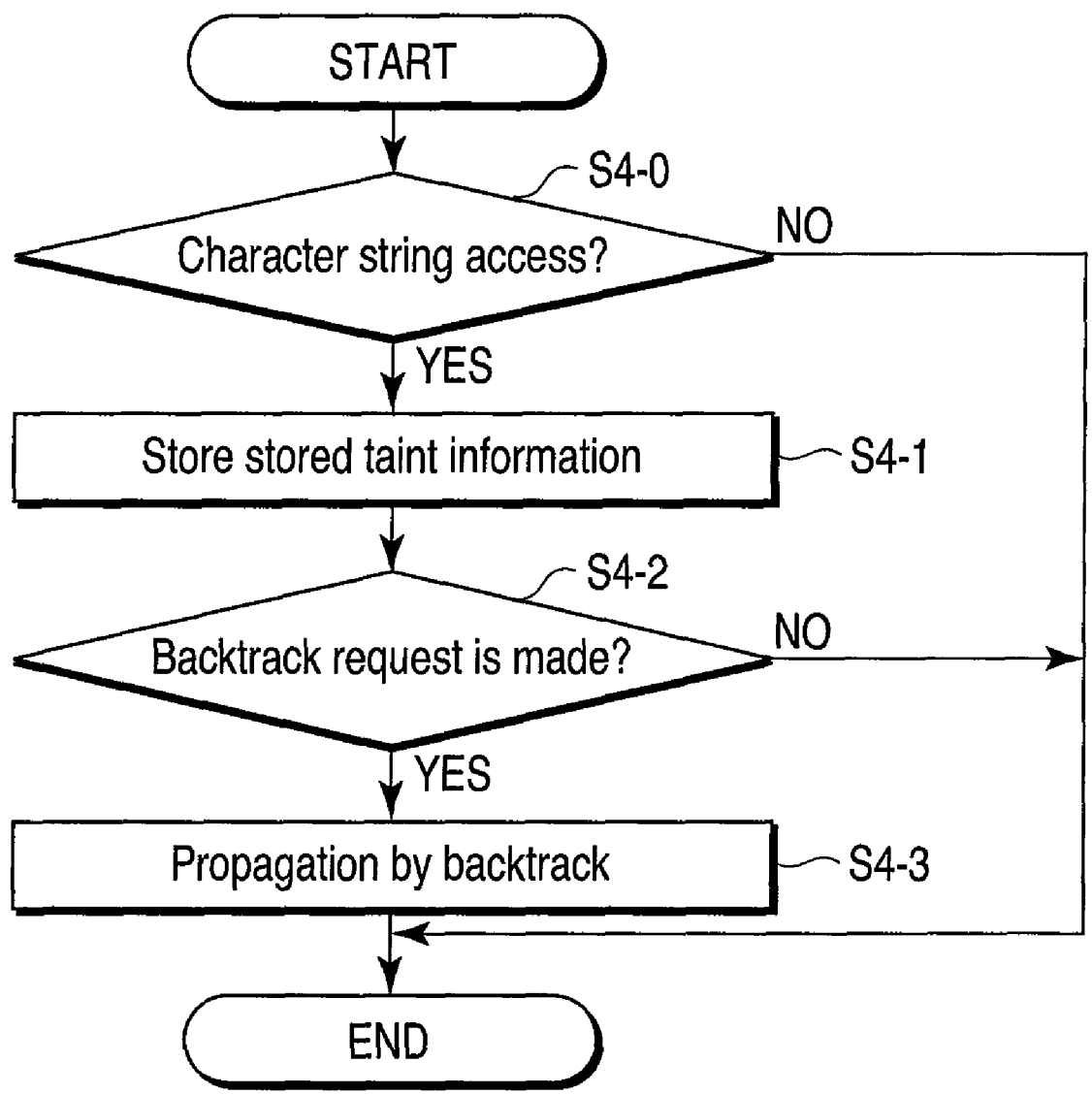
FIG. 16 is a flowchart showing an illustrative operation on execution of storing instruction according to the third embodiment.

FIG. 16 is shows an example of an operation at the time of execution of store instruction.

First, the character string detector determines whether the access is to a character string in step S4-0. When the access is not to a character string, the process terminates here.

When the access is to a character string, the taint information that was previously saved at the time of the load is stored. More specifically, the taint information that has been saved at the time of loading character string data (step S3-1 in FIG. 15) is stored to the corresponding address in step S4-1. Then, it is determined whether the backtrack is requested by the character string detector in step S4-2. If the backtrack was requested, propagation by the backtrack, which will be described later, is performed in step S4-3.

Note that steps S4-1 to S4-3 are executed by, for example, a processor.

[Propagation by Backtrack]

When the backtrack is requested by the character string detector in step S4-2 in FIG. 16, the taint information of the size designated by "1. Propagation size" propagates from the following "2. Input address" to "3. Output address".

1. Propagation size: the access count (cnt) in the entry corresponding to the character string detected in step S4-0

2. Input address: the leading address of the load to the character string most recently detected (base_adr)

3. Output address: the result of subtracting the "1. Propagation size" from the address of the store The present invention can be utilized as a propagation method of taint information on all the levels from software of the language processing system and the like to the platform of a VM, processor, and the like.

In addition, the present invention is not limited to the above-mentioned embodiments, and can be variously modified in the implementation stage within the scope not deviating from the gist of the invention. Furthermore, inventions of various stages are included in the embodiments described above, and by an appropriate combination of a plurality of disclosed constituent elements, various inventions can be extracted. For example, even when some constituent elements are deleted from all the constituent elements shown in the embodiments, if the problem stated in the paragraph of "problem to be solved" can be solved, and the advantage stated in the paragraph of "advantage of the invention" can be obtained, the configuration obtained after deleting the constituent elements can be extracted as an invention.

What is claimed is:

1. An information processing device comprising:
    a reading series detection section that detects a first reading series which includes first reading events for reading out first character string data with first tracking information added thereto, first occurrence timings of the first reading events included in the first reading series, second reading series which includes second reading events for reading out second character string data with second tracking information added thereto, and second occurrence timings of the second reading events included in the second reading series, from a memory section;
    a writing series detection section that detects a writing series which includes writing events for writing third character string data into the memory section, and third occurrence timings of the writing events;
    an interleaving determination section that executes first determining whether a first interleaving relationship is satisfied between first reading event groups each of which is included in the first reading series and includes one or more first sequential reading events and writing event groups each of which is included in the writing series and includes one or more sequential writing events, and executes second determining whether a second interleaving relationship is satisfied between second reading event groups each of which is included in the second reading series and includes one or more sequential second reading events and the writing event groups, on the basis of the first reading series and the first occurrence timings, the second reading series and the second occurrence timings which are detected by the reading series detection section, and the writing series and the third occurrence timings which are detected by the writing series detection section; and a tracking information addition section that adds proximate tracking information corresponding to a proximate reading event included in a proximate reading event group of the reading event groups having the first or second interleaving relationships for the writing event groups to the third character string data, when the interleaving determination section determines that both of the first and second relationships are satisfied.

2. An information processing device according to claim 1, wherein the interleaving, determination section determines that the first interleaving relationship is satisfied when a previous writing event group in the writing series occurs after a previous first reading event group in the first reading series and then a subsequent writing event group in the writing series occurs after a subsequent first reading, event group in the first reading series, and determines that the second interleaving relationship is satisfied when the previous writing event group occurs after a previous second reading event group in the second reading series and then the subsequent writing event group occurs after a subsequent second reading event group in the second reading series.

3. An information processing device according to claim 2, wherein the tracking information addition section, when a writing event adding the tracking information occurs based on the first and second reading events, adds last tracking information of a last reading event of the first and second reading events to the third character string data to be written.

4. An information processing method executed by a computer comprising:

detecting a first reading series which includes first reading events for reading out first character string data with first tracking information added thereto, first occurrence timings of the first reading events included in the first reading series, a second Leading series which includes second reading events for reading out second character string data with second tracking information added thereto, and second occurrence timings of the second reading events included in the second reading series, from a memory section;

detecting a writing series which includes writing events for writing third character string data into the memory section, and third occurrence timings of the writing events;

executing first determining whether a first interleaving relationship is satisfied between first reading event groups each of which is included in the first reading series and includes one or more sequential first reading events and writing event groups each of which is included in the writing series and includes one or more sequential writing events, and executing second determining whether a second interleaving relationship is satisfied between second reading event groups each of which is included in the second reading series and includes one or more sequential second reading events and the writing event groups, on the basis of the first reading series and the first occurrence timings, the second reading series and the second occurrence timings which are detected, and the writing series and the third occurrence timings which are detected; and adding the proximate tracking information corresponding to a proximate reading event included in a proximate reading event group of the reading event groups having the first or second interleaving relationship for the writing event groups to the third character string data, when both of the first and second relationships are satisfied.

5. An information processing method according to claim 4, determines that the first interleaving relationship is satisfied when a previous writing event group in the writing series occurs after a previous first reading event group in the first reading series and then a subsequent writing event group in the writing series occurs after a subsequent first reading event group in the first reading series, and determines that the second interleaving relationship is satisfied when the previous writing event group occurs after a subsequent second reading event group in the second reading series and then the subsequent writing event group occurs after a subsequent second reading event group in the second reading series.

6. An information processing method according to claim 5, when a writing event adding the tracking information occurs based on the first and second reading events, adds last tracking information of a last reading event of the first and second reading events to the third character string data to be written.

7. A non-transitory computer readable recording medium storing a program being executed by a computer, wherein the program comprises:

a reading series detection section that detects a first reading series which includes a first reading events for reading out first character string data with first tracking information added thereto, first occurrence timings of the first reading events included in the first reading series, a second reading series which includes second reading events for reading, out second character string data with second tracking information added thereto, and second occurrence timings of the second reading events included in the second reading series, from a memory section;

a writing series detection section that detects a writing series which includes writing events for writing third character string data into the memory section, and third occurrence timings of the writing events;

an interleaving determination section that executes first determining whether a first interleaving relationship is satisfied between first reading event groups each of which is included in the reading series and includes one or more sequential first reading events and writing event groups each of which is included in the writing series and includes one or more sequential writing events, and executes second determining whether a second interleaving relationship is satisfied between second reading event groups each of which is included in the second reading series and includes one or more sequential second reading events and the writing event groups, on the basis of the first reading series and the first occurrence timings, the second reading series and the second occurrence timings which are detected by the reading series detection section, and the writing series and the third occurrence timings which are detected by the writing series detection section; and a tracking information addition section that adds proximate tracking information corresponding to a proximate reading event included in a proximate reading event group of the reading event groups having, the first or second interleaving relationship for the writing event groups to the third character string data, when the interleaving determination section determines that both of the first and second relationships are satisfied.

8. A non-transitory computer readable recording medium according to claim 7, wherein the interleaving determination section determines that the first interleaving relationship is satisfied when a previous writing event group in the writing series occurs after a previous first reading event group in the first reading series and then a subsequent writing event group in the writing series occurs after a second subsequent first reading event group in the first reading series, and determines that the second interleaving relationship is satisfied when the previous writing event group occurs after a previous second reading event group in the second reading series and then the subsequent writing event group occurs after a subsequent second reading event group in the second reading series.

9. A non-transitory computer readable recording medium according to claim 8, wherein the tracking information addition section, when a writing event adding the tracking information occurs based on the first and second reading events, adds last tracking information of a last reading event of the first and second reading events to the third character string data to be written.

* * * * *

UNITED STATES PATENT AND TRADEMARK OFFICE
CERTIFICATE OF CORRECTION

PATENT NO. : 8,413,240 B2
APPLICATION NO. : 12/411771
DATED : April 2, 2013
INVENTOR(S) : S. Katsunuma et al.

It is certified that error appears in the above-identified patent and that said Letters Patent is hereby corrected as shown below:

In the Claims

| COLUMN | LINE | |
|---|---|---|
| 19 (Claim 2, | 30 line 7) | After "reading" delete "," |
| 19 (Claim 4, | 49 line 7) | "Leading" should read --reading-- |
| 20 (Claim 4, | 7 line 32) | After "adding" delete "the" |
| 20 (Claim 7, | 34 line 5) | After "includes" delete "a" |
| 20 (Claim 7, | 39 line 10) | After "reading" delete "," |
| 21 (Claim 7, | 2 line 40) | After "having" delete "," |

Signed and Sealed this
Twenty-second Day of October, 2013

Teresa Stanek Rea
*Deputy Director of the United States Patent and Trademark Office*